United States Patent [19]
Fujiwara

[11] 3,765,292
[45] Oct. 16, 1973

[54] CUTTING DEVICE FOR A MOVING WEB

[75] Inventor: Kiyokazu Fujiwara, Kanagawa, Japan

[73] Assignee: Fuji Photo Film Co., Ltd., Kanagawa, Japan

[22] Filed: Dec. 17, 1971

[21] Appl. No.: 209,212

[30] Foreign Application Priority Data
Dec. 17, 1970 Japan.............................. 45/113921

[52] U.S. Cl................................... 83/614, 83/353
[51] Int. Cl............................ B26d 7/26, B26d 1/04
[58] Field of Search.............................. 83/353, 614

[56] References Cited
UNITED STATES PATENTS
3,365,992  1/1968  Dreher.................. 83/614
2,620,993  12/1952  Jeffrey, Jr............. 83/614
3,236,136  2/1966  Bach..................... 83/614
3,213,735  10/1965  Keferstein et al....... 83/353
2,283,838  5/1942  Williams................ 83/353 X Primary Examiner—J. M. Meister
Attorney—Richard C. Sughrue et al.

[57] ABSTRACT

A rotatable cutter member is mounted on a movable carrier such that its center of gravity is located on the shaft connected to the movable carrier. Thus, the cutter member can freely position itself relative to a moving web that is to be cut without introducing unwanted tension or an irregular cut line. A guide track supports the movement of the carrier while the cutter member forms a V-notch cutting edge.

5 Claims, 2 Drawing Figures

PATENTED OCT 16 1973　　　　　　　　　　　　　　　　3,765,292

CUTTING DEVICE FOR A MOVING WEB

BACKGROUND OF THE INVENTION

1. Field of the Invention

The present invention provides a cutting device for cutting a moving web wherein the cutting element is rotatably mounted on a shaft which is in turn mounted on a moving station. More particularly, the present invention is directed to a device for cutting a moving web at any angle such as a moving web of plastic film traveling in a straight line.

2. Description of the Prior Art

Cutting devices for cutting moving webs have been known in the prior art and particularly, there is a device for cutting thin paper that utilizes a sawtooth cutting edge. The cutting device, however, affects the continuity of flow of the moving web material and leaves a jagged or uneven cutting line. As a result of the irregular cutting line, the web is not readily adaptable to be wound on a core to produce a roll. Generally, for example, a film is immediately wound after the cutting step and an uneven cutting line will tend to bend or wrinkle the film member. In addition, the operation of a sawtooth cutter has been found to be dangerous in the industry.

In addition, when a plastic film web is to be cleanly cut in a linear fashion, a rotating circular edge has been utilized to move along the opposite edge so as to both cut and tentatively stop the moving web during the operation.

The prior art has been plagued with problems of accuracy and with safety problems related to the rotating blade member. In thos cases where the moving web is stopped temporarily for cutting, it is often necessary to provide an accumulator or reservoir to permit the continual processing and production of the web member.

SUMMARY OF THE INVENTION

It is therefore an object of the present invention to provide a device for cutting a moving web such as a plastic film which eliminates the aforementioned disadvantages of the conventional cutting devices utilized in the prior art. It is further an object of the present invention to provide a cleanly cut edge at any linear angle. The present invention permits the cutting of a moving web without any danger to the operator. Basically, the present invention provides a cutting element which is rotatably mounted on a shaft which is in turn mounted on a movable carrier that can be driven or pulled across the path of the moving web.

BRIEF DESCRIPTION OF THE DRAWINGS

Other objects, features and advantages of this invention will become apparent from the following description taken in conjunction with the accompanying drawings, in which.

DESCRIPTION OF THE PREFERRED EMBODIMENT

Figure 1:
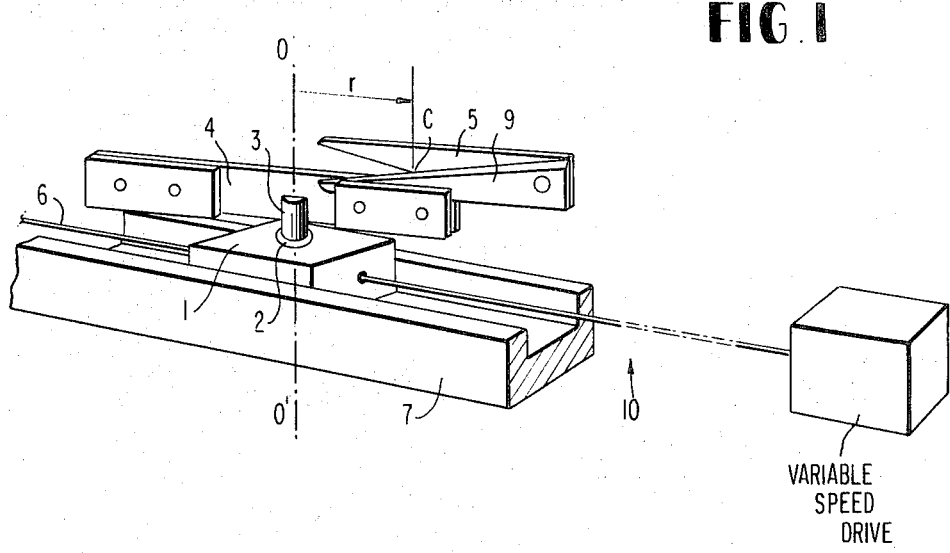
FIG. 1 is a perspective view of the cutting device constructed in accordance with the present invention.

Referring to the above drawings, a cutter 9 is mounted on a cutter moving device or carrier 1. The cutter 9 is constructed as disclosed in FIG. 1, with a cutting edge 5 of a pair of scissor type cutters. The cutter edge 5 is provided on a cutter beam member 4 which in turn is mounted on a shaft 3 mounted on the cutter moving device 1. The cutter 9 is rotatably mounted via the cutter shaft 3 by a bearing 2 on the carrier 1, so that it is rotatable about the axial center $OO'$. The cutter beam member 4 is balanced so that the center of gravity of the cutter 9 lies on the axial shaft 3.

The web cutting point C of the cutter edge 5 is provided at a position displaced in the amount of r from the axial center $OO'$. A cutter moving device 10 comprises a chain, wire or shaft 6, for driving the cutter and is connected to a variable speed motor or other appropriate means for varying the speed of the cutter. A guide rail 7 controls the movement of the cutter device as it is driven.

Figure 2:
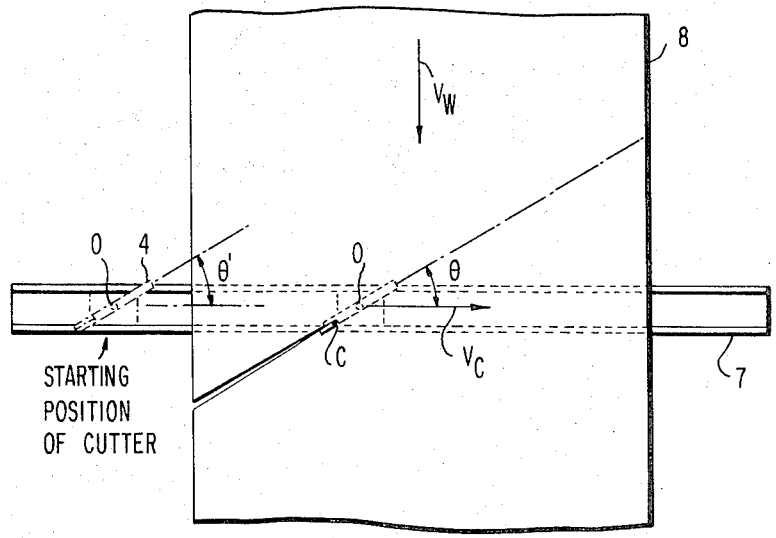
FIG. 2 is a plan view of the cutting device during operation.

In operation, the cutter device is pulled or driven across a moving plastic web as disclosed in FIG. 2 and in the process cuts the web without any deformation. The guide rail 7 is positioned so that the web cutting point C of the cutting edge 5 of the cutter 9 is disposed on the same plane as the plane that the web is moving.

If the cutter 9 is moved at a speed of $Vc$ perpendicularly to the web 8 moving at a speed of $Vw$, the web cutting point C of the cutter edge 5, will adjust itself corresponding to the two relative speeds to provide a cutting angle relative to the movement of the web such that $\Theta = \tan^{-1} Vw/Vc$. Generally, it is preferable that cutting edge 5 be prealigned along the $\Theta$ angle to insure a linear cut. When the cutting edge 5 engages the web, it is preferred that the cutting edge be completely free so that it is capable of rotating about the shaft 3. This permits the direction of the cutter 9 to be automatically determined only by the web speed $Vw$ and the moving speed $Vc$ of the cutter 9. The angle cut on the moving web may be varied by adjusting both the guide track 7 and the speed of the cutter 9 by, for example, a variable speed motor means. It has been found that even if the moving speed $Vw$ of the web and the moving speed $Vc$ of the cutter 9 change during the cutting operation, the only result is that the cutting line will curve, but will not produce any defects.

It should be understood from the above description that since the web cutting point C follows without difficulty with respect to the movement of the cutter shaft 3 by displacing the web cutting point C of the cutting edge 5 in the amount r from the axial center to automatically determine the angle $\Theta$ formed between the direction of the cutter edge and the moving direction of the cutter 9. Since the cutter is freely rotatable, there is no adverse tension applied to the web and accordingly, any buckling or jagged cuts will not occur.

It should also be noted that since the sharp edge of the cutter 9 is not exposed except when the cutter is moving during the invention, the cutting edge may become compact and be appropriately guarded to provide a safe operation for an operator in comparison with the conventional device.

It should also be understood that since the device may gradually cut the web at an angle $\Theta = \tan^{-1} Vw/Vc$, the tension of the moving web will not be abruptly affected by the cutting and since it will produce a sharp end, it will be easy for insertion into a new core for winding purposes.

Since various modifications can be made by a person skilled in the art, it is clear that the scope of the present invention should be measured from the following claims.

What is claimed is:

1. A cutting assembly for cutting a relatively moving member with a minimum of tension in the member comprising:

a carrier member;

guide means for the carrier member;

means for moving the carrier member, cutter means mounted on the carrier member and freely rotatable relative to the moving member for cutting the moving member as a function of the speed of the carrier member and the moving member, said cutter means including a support member and a cutter blade, said cutter blade being located at one end of the support member, a shaft connecting the support member to the carrier member at the center of gravity of the support member and the cutter blade and said cutter blade being V-shaped and fixed relative to said support member.

2. A cutting assembly as in claim 1, where a variable speed means drives the carrier member.

3. A cutting assembly as in claim 1, where the guide means includes a track.

4. A cutting assembly as in claim 1, where the support member is counter balanced with respect to the weight of the cutter blade.

5. A cutting assembly as in claim 2, where the cutting angle between the moving member and the cutter blade is $\Theta = \tan^{-1} V_w/V_c$, where $V_w$ equals moving member velocity and $V_c$ equals cutter blade velocity.

* * * * *